United States Patent
Badri et al.

(10) Patent No.: US 11,288,561 B2
(45) Date of Patent: Mar. 29, 2022

(54) METHODS AND APPARATUS FOR A SECURITY STICKER ANTI-TAMPERING SYSTEM

(71) Applicant: CoreKinect LLC, Tempe, AZ (US)

(72) Inventors: Assar Badri, Scottsdale, AZ (US); Mitchel Kelley, Gilbert, AZ (US); Almedin Kozlica, Phoenix, AZ (US)

(73) Assignee: CoreKinect LLC, Tempe, AZ (US)

( * ) Notice: Subject to any disclaimer, the term of this patent is extended or adjusted under 35 U.S.C. 154(b) by 31 days.

(21) Appl. No.: 17/092,561

(22) Filed: Nov. 9, 2020

(65) Prior Publication Data
US 2021/0142141 A1    May 13, 2021

Related U.S. Application Data

(60) Provisional application No. 62/932,302, filed on Nov. 7, 2019.

(51) Int. Cl.
| | | |
|---|---|---|
| *G08B 21/00* | (2006.01) | |
| *G06K 19/077* | (2006.01) | |
| *H01Q 1/22* | (2006.01) | |
| *G06K 19/07* | (2006.01) | |
| *G06K 19/02* | (2006.01) | |

(52) U.S. Cl.
CPC ..... *G06K 19/07707* (2013.01); *G06K 19/025* (2013.01); *G06K 19/0702* (2013.01); *G06K 19/0723* (2013.01); *G06K 19/0776* (2013.01); *H01Q 1/22* (2013.01)

(58) Field of Classification Search
CPC ........... G06K 19/07707; G06K 19/025; G06K 19/0702; G06K 19/0723; G06K 19/0776; G06K 19/07381; H01Q 1/22; H01Q 1/2225; H01Q 9/42
USPC ...................................................... 340/572.8
See application file for complete search history.

(56) References Cited

U.S. PATENT DOCUMENTS

| | | | |
|---|---|---|---|
| 2002/0036237 A1* | 3/2002 | Atherton ............ | G06K 19/0739 235/492 |
| 2006/0077060 A1* | 4/2006 | Lerch ................ | G08B 13/2434 340/572.3 |
| 2006/0195705 A1* | 8/2006 | Ehrensvard .......... | H04L 9/3271 714/E11.207 |
| 2007/0029384 A1* | 2/2007 | Atherton ............. | G06K 19/073 340/572.7 |
| 2008/0143519 A1* | 6/2008 | Piotrowski ........ | G06K 19/07372 340/540 |
| 2018/0163095 A1* | 6/2018 | Khoche ............ | G06K 19/07773 |

(Continued)

*Primary Examiner* — Mark S Rushing
(74) *Attorney, Agent, or Firm* — Noblitt & Newson, PLLC

(57) ABSTRACT

An anti-tampering device for an RFID tag according to various aspects of the present technology may include a flexible circuit card and an anti-tamper sticker. The anti-tamper sticker may be configured to include a circuit printed on a surface of the anti-tamper sticker that is electrically coupled to the circuit card. The printed circuit may be comprised of conductive ink extending between a pair of vias that are connected to vias on the circuit card when the anti-tamper sticker is positioned over the circuit card. Any attempt to remove the anti-tamper sticker causes the printed ink to disrupt the electrical connection between the two vias breaking a circuit with the circuit card. The circuit card may be configured to respond to the disruption to indicate that the RFID tag has been compromised.

6 Claims, 1 Drawing Sheet

(56) References Cited

U.S. PATENT DOCUMENTS

2020/0357262 A1* 11/2020 Walsh .................... E05G 1/024
2020/0364523 A1* 11/2020 Badri ................ G06K 19/0702

* cited by examiner

METHODS AND APPARATUS FOR A SECURITY STICKER ANTI-TAMPERING SYSTEM

CROSS-REFERENCES TO RELATED APPLICATIONS

This application claims the benefit of U.S. Provisional Patent Application No. 62/932,302, filed Nov. 7, 2019, and incorporates the disclosure of the application by reference.

BACKGROUND OF THE TECHNOLOGY

Various methods are used to indicate when a device has been tampered with or otherwise accessed without authorization. For example, an electrical device may typically have a void warranty sticker placed over a seam or enclosure access point to dissuade unauthorized access. These void warranty stickers typically use a combination of adhesives to leave difficult to remove marks on the devices while rendering the sticker no longer usable, clearly identifying the device has been tampered with or accessed.

Other manufactured products go through many production phases between initial manufacture, distributors, and consumer delivery. Tracking the manufactured products through a supply chain allows manufacturers and businesses to monitor quality, movement within the supply chain, identify risks, and maintain competitiveness in the marketplace. Regulated industries such as food and pharmaceutical products may require detailed tracking of their product's source suppliers, lot numbers, serial numbers, and the consumer that received the finished product in order to respond to consumer complaints and regulatory requirements.

Tracking devices are commonly attached to goods as they travel through the supply chain. A common example is an RFID tag attached to a surface of the good or transportation packing. The RFID tag allows for the product to be easily identified during shipping. However, these devices may be susceptible to tampering. For example, various types of tracking devices, including an RFID tag, may be separated from the good or shipping container reducing visibility or providing an opportunity for the good to be changed, altered, or moved without being tracked.

SUMMARY OF THE TECHNOLOGY

An anti-tampering device for an RFID tag according to various aspects of the present technology may include a flexible circuit card and an anti-tamper sticker. The anti-tamper sticker may be configured to include a circuit printed on a surface of the anti-tamper sticker that is electrically coupled to the circuit card. The printed circuit may be comprised of conductive ink extending between a pair of vias that are connected to vias on the circuit card when the anti-tamper sticker is positioned over the circuit card. Any attempt to remove the anti-tamper sticker causes the printed ink to disrupt the electrical connection between the two vias breaking a circuit with the circuit card. The circuit card may be configured to respond to the disruption to indicate that the RFID tag has been compromised.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various materials, dimensions, and geometries, which may carry out a variety of operations suited to a specified application or environment. In addition, the present technology may be practiced in conjunction with any number of devices for conducting electrical signals, monitoring one or more conditions, and transmitting and/or receiving data, and the system described is merely one exemplary application for the technology.

An anti-tampering system according to various aspects of the present technology may operate in conjunction with any type of security tape or conductive material. Various representative implementations of the present technology may be applied to multi-adhesive tape systems designed to provide an indication when the tape has been tampered with. For example, the described technology may be used to create a security device that not only provides a visual indication of tampering but also generates and transmits an electronic signal indicating that the security device has been triggered.

Figure 1:
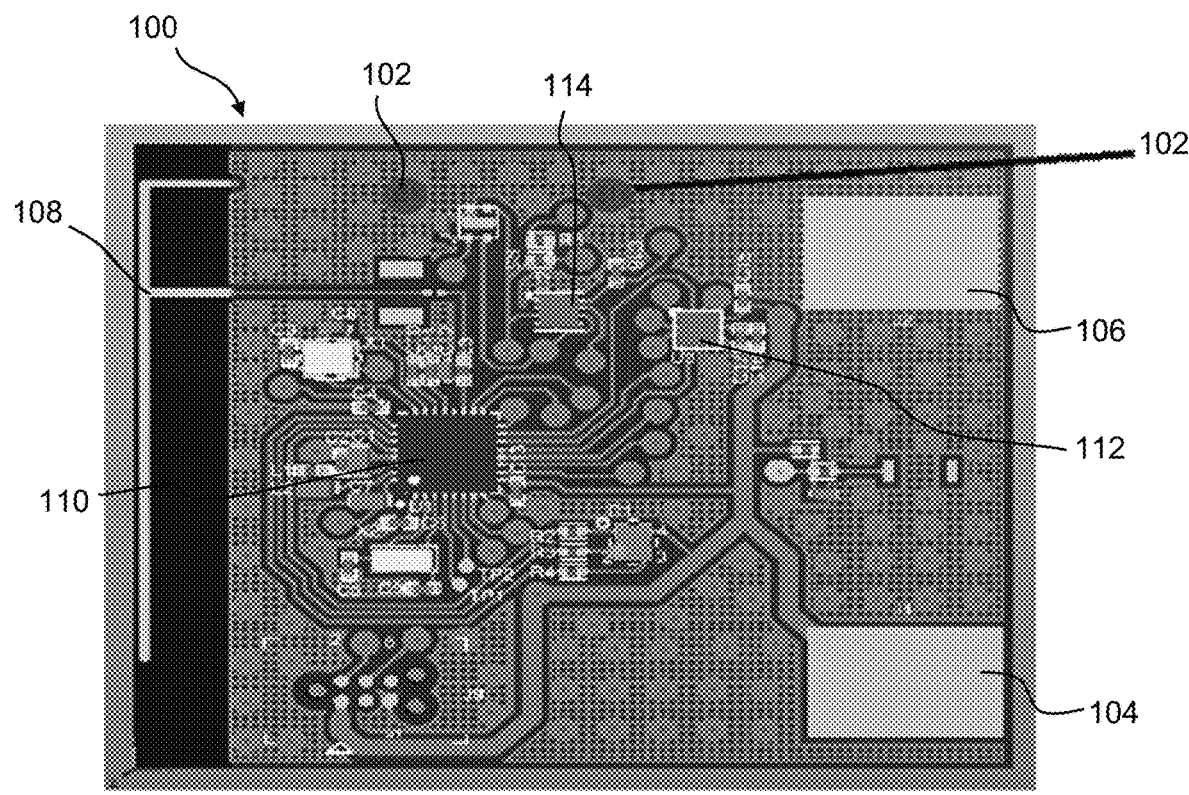
FIG. 1 representatively illustrates a flexible circuit board in accordance with an exemplary embodiment of the present technology.
Figure 2:
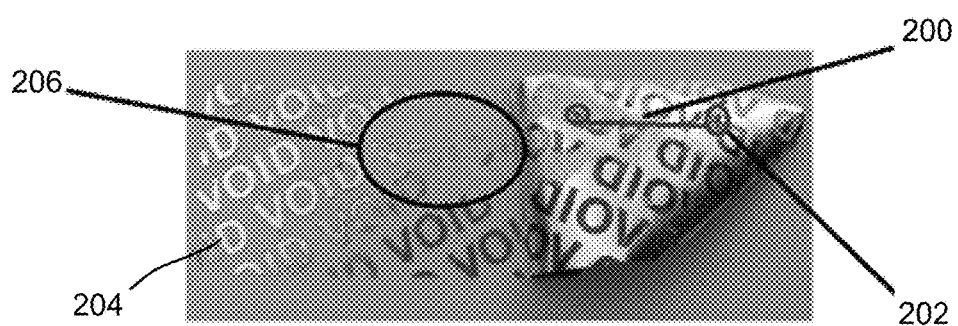
FIG. 2 representatively illustrates a conductive security tape in accordance with an exemplary embodiment of the present technology.

Referring to FIGS. 1 and 2, in one representative embodiment, the anti-tampering system may comprise a security sticker 200 or tape positioned over an electrical circuit board 100. A conductive ink may be printed onto a surface of the security sticker and be electrically connected to the circuit board. The conductive ink may be connected to the circuit board during manufacture or the electrical connection may be made when the anti-tampering system is affixed to a device. For example, when the sticker is placed onto a desired surface, the act of affixing the sticker may complete an electrical connection between the conductive ink and the circuit board such that the anti-tampering system becomes activated. Alternatively, the electrical connection between the conductive ink and the circuit board may be created when the anti-tampering system is manufactured such that the anti-tampering system is already activated prior to being placed into use.

Any attempt to remove the sticker after being affixed to the device would disturb or otherwise damage the conductive ink impacting the electrical circuit created between the conductive ink and the circuit board. For example, if someone attempted to remove the sticker by peeling it off of the device the tape may tear, stretch, or break causing damage to the surface that the conductive ink has been printed on. This damage may interrupt or otherwise sever the electrical connection. The loss of connection may be interpreted by the circuit board as one of several predetermined conditions and generate and/or transmit an electrical signal. For example, in one embodiment, the circuit board would sense the disturbance of the electrical signal, and consequently trigger an interrupt to occur. This interrupt may cause the circuit board to perform any desired function such as to disable the anti-tampering system, transmit a wireless communication indicating that an intrusion occurred, or trigger a routine indicating the anti-tampering system has completed its life cycle and to perform a permanent and complete system shutdown.

Referring to now FIG. 1, an exemplary embodiment of the anti-tampering system may comprise a flexible circuit board 100 having a microcircuit, a set of vias 102, a pair of battery terminals 104, 106, and an antenna 108. The battery may provide power to each of the electronic components on the flexible circuit board 100. In some embodiments, the battery may be any thin film, flexible, or printed battery cell that may allow for safe transmission of power to the electronic components without risk of fire. For example, the battery may comprise advanced lithium-ion batteries, solid-state batteries, micro-batteries, stretchable batteries, thin flexible supercapacitors, or a manganese dioxide-based battery.

The microcircuit may comprise a main microcontroller 110, input output ports (I/O ports), a memory device 112 and any other suitable components. For example, in one embodiment, the microcircuit may comprise a Bluetooth transmitter and or a micro Global Positioning System (GPS) chip 114 that is configured to generate a wireless signal in response to the occurrence of a specified condition.

The microcircuit may also be programmed to conserve the life of the battery. For example, the microcircuit may transmit "pings" such that the end user can calculate the life of the battery or remain in sleep mode until the flexible circuit board 100 comes into an RFID field.

Referring now to FIG. 2, the security sticker 200 is configured to be positioned over the flexible circuit board 100. A surface of the security sticker 200 may be printed throughout with a conductive ink 204. A second set of vias 202 may also be embedded in the surface of the security sticker 200 and be electrically coupled to the conductive ink 204. Alternatively, the second set of vias 202 may be formed as part of the conductive ink 204. The second set of vias 202 may be positioned on the security sticker 200 in a manner such that they are aligned with the first set of vias 102 on the flexible circuit board 100 and may be electrically coupled when in contact with each other. When the two sets of vias 102, 202 are in contact with each they may complete an electrical circuit between the security sticker 200 and the flexible circuit board 100.

If removal or lifting of the security sticker is attempted, the conductive ink may be damaged 206 breaking the electrical circuit. The break in the electrical circuit may cause an interrupt to the microcircuit and generating the condition for the Bluetooth transmitter or GPS chip 114 to generate the wireless signal. This wireless signal may be transmitted broadly when the interrupt occurs or the signal may be transmitted the next time the microcircuit senses an RFID field or detects a wireless communication network that the signal may be transmitted over.

The signal may also be used to help identify when the interrupt occurred. For example, the microcircuit may store a set of data such as date/time, GPS coordinates, temperature, or any other factors capable of being collected by the flexible circuit board 100 that corresponds to the time when the interrupt occurred. Alternatively, the stored data set may be saved for later access or transmission, such as when the flexible circuit board 100 arrives at a predetermined destination and is scanned by an RFID system.

The interrupt may also cause the microcircuit to disable the flexible circuit board 100 to indicate that the anti-tampering system has been compromised. For example, the interrupt may cause the flexible circuit board 100 to become inoperable, nonresponsive, or otherwise disabled. A disabled flexible circuit board 100 may help indicate to shipping personnel that a package has been tampered with during shipment.

These and other embodiments for methods for an anti-tampering system may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

The invention claimed is:

1. An anti-tampering device, comprising:
   a flexible circuit card, comprising:
      a battery;
      a first set of vias; and
      an antenna;

a security sticker positioned over the flexible circuit card, comprising:
- a second set of vias configured to contact the first set of vias when the security sticker is positioned over the flexible circuit card to complete an electrical circuit between the flexible circuit card and the security sticker; and
- conductive ink dispersed throughout the security sticker and electrically coupling the second set of vias together.

2. The anti-tampering device according to claim 1, wherein the flexible circuit card further comprises:
- a microcontroller;
- a memory device; and
- a radio frequency transmitter,
  wherein the flexible circuit card is configured to generate a signal that the anti-tampering device has been comprised if the conductive ink is damaged.

3. The anti-tampering device according to claim 2, wherein the signal comprises a wireless communication transmitted from the radio frequency transmitter indicating that the anti-tampering device has been disabled.

4. The anti-tampering device according to claim 2, wherein the signal disables the flexible circuit card from functioning.

5. The anti-tampering device according to claim 2, wherein the flexible circuit card further comprises a GPS tracking chip.

6. The anti-tampering device according to claim 1, wherein one side of the flexible circuit card comprises an adhesive backing to allow the flexible circuit card to be affixed to another object.

* * * * *